(12) United States Patent
Nickerson et al.

(10) Patent No.: US 12,118,677 B2
(45) Date of Patent: Oct. 15, 2024

(54) SPATIALLY AWARE ENVIRONMENT INTERACTION

(71) Applicant: ARKH, Inc., Dallas, TX (US)

(72) Inventors: Landon Nickerson, Dallas, TX (US); Sean Ong, Tukwila, WA (US); Preston McCauley, Dallas, TX (US)

( * ) Notice: Subject to any disclaimer, the term of this patent is extended or adjusted under 35 U.S.C. 154(b) by 0 days.

(21) Appl. No.: 17/560,146

(22) Filed: Dec. 22, 2021

(65) Prior Publication Data

US 2022/0198765 A1 Jun. 23, 2022

Related U.S. Application Data

(60) Provisional application No. 63/129,425, filed on Dec. 22, 2020.

(51) Int. Cl.
*G06T 19/00* (2011.01)
*G06F 16/955* (2019.01)
*G06T 19/20* (2011.01)
*H04L 67/131* (2022.01)

(52) U.S. Cl.
CPC .......... *G06T 19/006* (2013.01); *G06F 16/955* (2019.01); *G06T 19/20* (2013.01); *H04L 67/131* (2022.05)

(58) Field of Classification Search
CPC .................................................. G06T 19/006
See application file for complete search history.

(56) References Cited

U.S. PATENT DOCUMENTS

| | | |
|---|---|---|
| 5,945,978 A | 8/1999 | Holmes |
| 7,215,321 B2 | 5/2007 | SanGiovanni |
| 7,716,586 B2 | 5/2010 | Dieberger et al. |
| 8,031,172 B2 | 10/2011 | Kruse et al. |
| 8,232,976 B2 | 7/2012 | Yun et al. |
| 8,378,795 B2 | 2/2013 | Steger et al. |
| 8,599,152 B1 | 12/2013 | Wurtenberger et al. |
| 8,698,764 B1 | 4/2014 | Karakotsios et al. |
| 8,799,803 B2 | 8/2014 | Amm |
| 8,809,716 B2 | 8/2014 | Gohng et al. |
| 8,830,163 B2 | 9/2014 | Sim et al. |
| 8,860,763 B2 | 10/2014 | Privault et al. |
| 9,030,424 B2 | 5/2015 | Shih et al. |
| 9,141,148 B2 | 9/2015 | Richter et al. |
| 9,141,272 B1 | 9/2015 | Cleron et al. |
| 9,229,540 B2 | 1/2016 | Mandella et al. |
| 9,268,483 B2 | 2/2016 | Dennis et al. |
| 9,330,545 B2 | 5/2016 | Kempin et al. |
| 9,335,790 B2 | 5/2016 | Stotler |

(Continued)

*Primary Examiner* — Charles Tseng
(74) *Attorney, Agent, or Firm* — Conley Rose, P.C.; Grant Rodolph; Robert E. Kent

(57) ABSTRACT

In some examples, an apparatus includes a memory storing computer executable instructions for implementing a spatially aware computing scheme; and a processor coupled to the memory and configured to execute the executable instructions. Executing the executable instructions causes the processor to access a spatial augmentation layer (SAL) that includes augmented reality (AR) elements placed into an AR environment for a physical environment proximate to the apparatus, and display the AR elements on a display screen communicatively coupled to the apparatus, wherein at least some of the AR elements are elements placed into the AR environment by a user other than a user of the apparatus.

20 Claims, 4 Drawing Sheets

(56) References Cited

U.S. PATENT DOCUMENTS

| | | |
|---|---|---|
| 9,335,823 B2 | 5/2016 | Modarres et al. |
| 9,383,839 B1 | 7/2016 | Rost et al. |
| 9,412,002 B2 | 8/2016 | Magi |
| 9,446,665 B2 | 9/2016 | Abel et al. |
| 9,474,580 B2 | 10/2016 | Hannaford et al. |
| 9,535,550 B2 | 1/2017 | Levesque et al. |
| 9,535,557 B2 | 1/2017 | Bernstein et al. |
| 9,547,366 B2 | 1/2017 | Ullrich et al. |
| 9,600,076 B2 | 3/2017 | Levesque et al. |
| 9,600,083 B2 | 3/2017 | Levesque et al. |
| 9,606,624 B2 | 3/2017 | Cruz-Hernandez et al. |
| 9,645,647 B2 | 5/2017 | Levesque |
| 9,690,377 B2 | 6/2017 | Lee et al. |
| 9,690,381 B2 | 6/2017 | Levesque et al. |
| 9,690,382 B1 | 6/2017 | Moussette et al. |
| 9,696,822 B2 | 7/2017 | Dow et al. |
| 9,713,500 B2 | 7/2017 | Kim et al. |
| 9,746,921 B2 | 8/2017 | Mallinson |
| 9,746,933 B2 | 8/2017 | Burba et al. |
| 9,778,813 B2 | 10/2017 | Shenfield et al. |
| 9,785,123 B2 | 10/2017 | Mansour et al. |
| 9,792,272 B2 | 10/2017 | Hicks |
| 9,798,388 B1 | 10/2017 | Murali |
| 9,830,782 B2 | 11/2017 | Morrell et al. |
| 9,880,697 B2 | 1/2018 | Anderson et al. |
| 9,891,709 B2 | 2/2018 | Heubel |
| 9,904,409 B2 | 2/2018 | Lee et al. |
| 9,927,902 B2 | 3/2018 | Burr et al. |
| 9,939,963 B2 | 4/2018 | Beckman |
| 9,945,818 B2 | 4/2018 | Ganti et al. |
| 9,946,505 B2 | 4/2018 | Becze et al. |
| 9,965,033 B2 | 5/2018 | Park et al. |
| 10,007,772 B2 | 6/2018 | Slaby et al. |
| 10,061,458 B1 | 8/2018 | Bristol et al. |
| 10,065,114 B2 | 9/2018 | Goetgeluk et al. |
| 10,088,902 B2 | 10/2018 | Keller et al. |
| 10,126,779 B2 | 11/2018 | von Badinski et al. |
| 10,126,941 B2 | 11/2018 | Zhu et al. |
| 10,146,308 B2 | 12/2018 | Cruz-Hernandez et al. |
| 10,183,217 B2 | 1/2019 | Chen et al. |
| 10,185,670 B2 | 1/2019 | Litichever et al. |
| 10,216,272 B2 | 2/2019 | Keller et al. |
| 10,331,777 B2 | 6/2019 | Hicks et al. |
| 10,346,038 B2 | 7/2019 | England et al. |
| 10,372,221 B2 | 8/2019 | Robert et al. |
| 10,372,270 B2 | 8/2019 | Hoggarth et al. |
| 10,386,960 B1 | 8/2019 | Smith |
| 10,416,774 B2 | 9/2019 | Weddle et al. |
| 10,437,337 B2 | 10/2019 | Park |
| 10,444,834 B2 | 10/2019 | Vescovi et al. |
| 10,490,035 B2 | 11/2019 | Morrell et al. |
| 10,496,193 B1 | 12/2019 | Alfano et al. |
| 10,496,235 B2 | 12/2019 | Woley et al. |
| 10,503,454 B2 | 12/2019 | Sirpal et al. |
| 10,509,469 B2 | 12/2019 | Erivantcev et al. |
| 10,514,780 B2 | 12/2019 | Su et al. |
| 10,514,831 B2 | 12/2019 | Sirpal et al. |
| 10,514,877 B2 | 12/2019 | Becze |
| 10,528,230 B2 | 1/2020 | Sirpal et al. |
| 10,528,312 B2 | 1/2020 | Reeves |
| 10,534,447 B2 | 1/2020 | Li |
| 10,540,052 B2 | 1/2020 | Gimpl et al. |
| 10,540,087 B2 | 1/2020 | Sirpal et al. |
| 10,545,580 B2 | 1/2020 | Yang et al. |
| 10,545,712 B2 | 1/2020 | Reeves et al. |
| 10,547,716 B2 | 1/2020 | Jeon et al. |
| 10,552,007 B2 | 2/2020 | Sirpal et al. |
| 10,558,321 B2 | 2/2020 | Sirpal et al. |
| 10,558,414 B2 | 2/2020 | Reeves et al. |
| 10,558,415 B2 | 2/2020 | de Paz |
| 10,572,095 B2 | 2/2020 | Sirpal et al. |
| 10,579,099 B2 | 3/2020 | Wang et al. |
| 10,592,061 B2 | 3/2020 | Sirpal et al. |
| 10,599,218 B2 | 3/2020 | Saboune et al. |
| 10,606,359 B2 | 3/2020 | Levesque et al. |
| 10,627,902 B2 | 4/2020 | Vescovi et al. |
| 10,652,383 B2 | 5/2020 | Selim |
| 10,664,121 B2 | 5/2020 | Sirpal et al. |
| 10,664,129 B2 | 5/2020 | Lee et al. |
| 10,678,411 B2 | 6/2020 | Reeves et al. |
| 10,684,478 B2 | 6/2020 | Osterhout |
| 10,698,486 B2 | 6/2020 | Reynolds et al. |
| 10,705,674 B2 | 7/2020 | Gimpl et al. |
| 10,706,251 B2 | 7/2020 | Shim et al. |
| 10,713,907 B2 | 7/2020 | Anderson et al. |
| 10,716,371 B2 | 7/2020 | Ward |
| 10,719,191 B2 | 7/2020 | Sirpal et al. |
| 10,719,232 B2 | 7/2020 | Tse |
| 10,740,058 B2 | 8/2020 | Sirpal et al. |
| 10,768,747 B2 | 9/2020 | Wang et al. |
| 10,775,891 B2 | 9/2020 | Sinclair et al. |
| 10,795,448 B2 | 10/2020 | Miller |
| 10,803,281 B2 | 10/2020 | Han et al. |
| 10,831,358 B2 | 11/2020 | Webber |
| 10,845,938 B2 | 11/2020 | Sirpal et al. |
| 10,849,519 B2 | 12/2020 | Mendenhall et al. |
| 10,852,154 B1 | 12/2020 | Knas et al. |
| 10,852,700 B2 | 12/2020 | Abramov |
| 10,853,013 B2 | 12/2020 | Sirpal et al. |
| 10,853,016 B2 | 12/2020 | Sirpal et al. |
| 10,871,871 B2 | 12/2020 | Cassar et al. |
| 10,893,833 B2 | 1/2021 | Harverinen et al. |
| 10,915,214 B2 | 2/2021 | Sirpal et al. |
| 10,922,870 B2 | 2/2021 | Vaganov |
| 10,942,615 B2 | 3/2021 | Helmes et al. |
| 10,949,051 B2 | 3/2021 | Sirpal et al. |
| 10,955,974 B2 | 3/2021 | Griffin |
| 10,963,007 B2 | 3/2021 | de Paz et al. |
| 10,964,178 B2 | 3/2021 | Aleksov et al. |
| 10,976,820 B2 | 4/2021 | Ganadas et al. |
| 10,976,822 B2 | 4/2021 | Dogiamis et al. |
| 10,983,559 B2 | 4/2021 | Reeves et al. |
| 10,990,242 B2 | 4/2021 | Sirpal et al. |
| 11,010,047 B2 | 5/2021 | Sirpal et al. |
| 11,061,476 B2 | 7/2021 | Remaley et al. |
| 11,073,826 B2 | 7/2021 | Cella et al. |
| 11,093,200 B2 | 8/2021 | Reeves et al. |
| 11,093,769 B2 | 8/2021 | Dow et al. |
| 11,106,355 B2 | 8/2021 | Kolondra et al. |
| 11,119,633 B2 | 9/2021 | Yamamoto |
| 11,132,161 B2 | 9/2021 | de Paz |
| 11,137,796 B2 | 10/2021 | Sirpal et al. |
| 11,151,234 B2 | 10/2021 | Kontsevich et al. |
| 11,182,046 B2 | 11/2021 | Sirpal et al. |
| 11,221,646 B2 | 1/2022 | Sirpal et al. |
| 11,221,647 B2 | 1/2022 | Sirpal et al. |
| 11,221,649 B2 | 1/2022 | Sirpal et al. |
| 11,226,710 B2 | 1/2022 | Sirpal et al. |
| 11,231,786 B1 | 1/2022 | Elangovan |
| 11,243,521 B2 | 2/2022 | Cella et al. |
| 11,262,792 B2 | 3/2022 | de Paz et al. |
| 11,340,857 B1* | 5/2022 | Smith ............ G06F 3/1454 |
| 2012/0092328 A1* | 4/2012 | Flaks ............ G06V 20/10 |
| | | 345/419 |
| 2015/0235447 A1* | 8/2015 | Abovitz ............ G01B 11/303 |
| | | 345/633 |
| 2016/0240007 A1* | 8/2016 | Weerasinghe ...... G06T 11/60 |
| 2016/0313902 A1* | 10/2016 | Hill ............ G06F 3/0482 |
| 2018/0174364 A1* | 6/2018 | Copic ............ G06F 3/011 |
| 2019/0102946 A1* | 4/2019 | Spivack ............ G06T 19/003 |
| 2019/0279407 A1* | 9/2019 | McHugh ............ G06F 3/011 |
| 2020/0105068 A1* | 4/2020 | Panse ............ G06T 19/006 |
| 2021/0200776 A1* | 7/2021 | Pounds ............ G06T 19/006 |
| 2021/0398316 A1* | 12/2021 | Panse ............ G06T 19/006 |

\* cited by examiner

SPATIALLY AWARE ENVIRONMENT INTERACTION

CROSS-REFERENCE TO RELATED APPLICATIONS

This application claims priority to U.S. Provisional Application No. 63/129,425 filed Dec. 22, 2020 by Landon Nickerson, et al., entitled "Spatially Aware Environment Interaction", which is incorporated by reference herein as if reproduced in its entirety.

BACKGROUND

Augmented reality (AR) technologies enable a merging of digital content and our physical environment. Through AR, digital content may be superimposed over our physical environment. Through AR, actions that we take in our physical environment may be processed digitally. Some technologies exist for placing digital content in a physical environment when viewed through a viewfinder, such as the screen of a smart device (e.g., smartphone, tablet, wearable device, etc.) in an AR session.

SUMMARY

In some examples, an apparatus includes a memory storing computer executable instructions for implementing a spatially aware computing scheme; and a processor coupled to the memory and configured to execute the executable instructions. Executing the executable instructions causes the processor to access a spatial augmentation layer (SAL) that includes augmented reality (AR) elements placed into an AR environment for a physical environment proximate to the apparatus, and display the AR elements on a display screen communicatively coupled to the apparatus, wherein at least some of the AR elements are elements placed into the AR environment by a user other than a user of the apparatus.

In some examples, a system includes a spatial computing hub and a spatial computing device. The spatial computing device is configured to access a SAL that includes AR elements placed into an AR environment for a physical environment proximate to the spatial computing device and display the AR elements on a display screen communicatively coupled to the spatial computing device, wherein at least some of the AR elements are elements placed into the AR environment by a user other than a user of the spatial computing device.

In some examples, a computer program product comprises computer executable instructions, executable by a processor. When executed, the instructions cause the processor to receive an indication of AR elements placed in a SAL of an AR environment by a user of a spatial computing device for a physical environment proximate to the spatial computing device, store the SAL, and provide the SAL to the spatial computing device responsive to the spatial computing device initiating an AR session that includes the SAL.

BRIEF DESCRIPTION OF THE DRAWINGS

For a more complete understanding of this disclosure, reference is now made to the following brief description, taken in connection with the accompanying drawings and detailed description, wherein like block numerals represent like parts.

DETAILED DESCRIPTION

Figure 1:
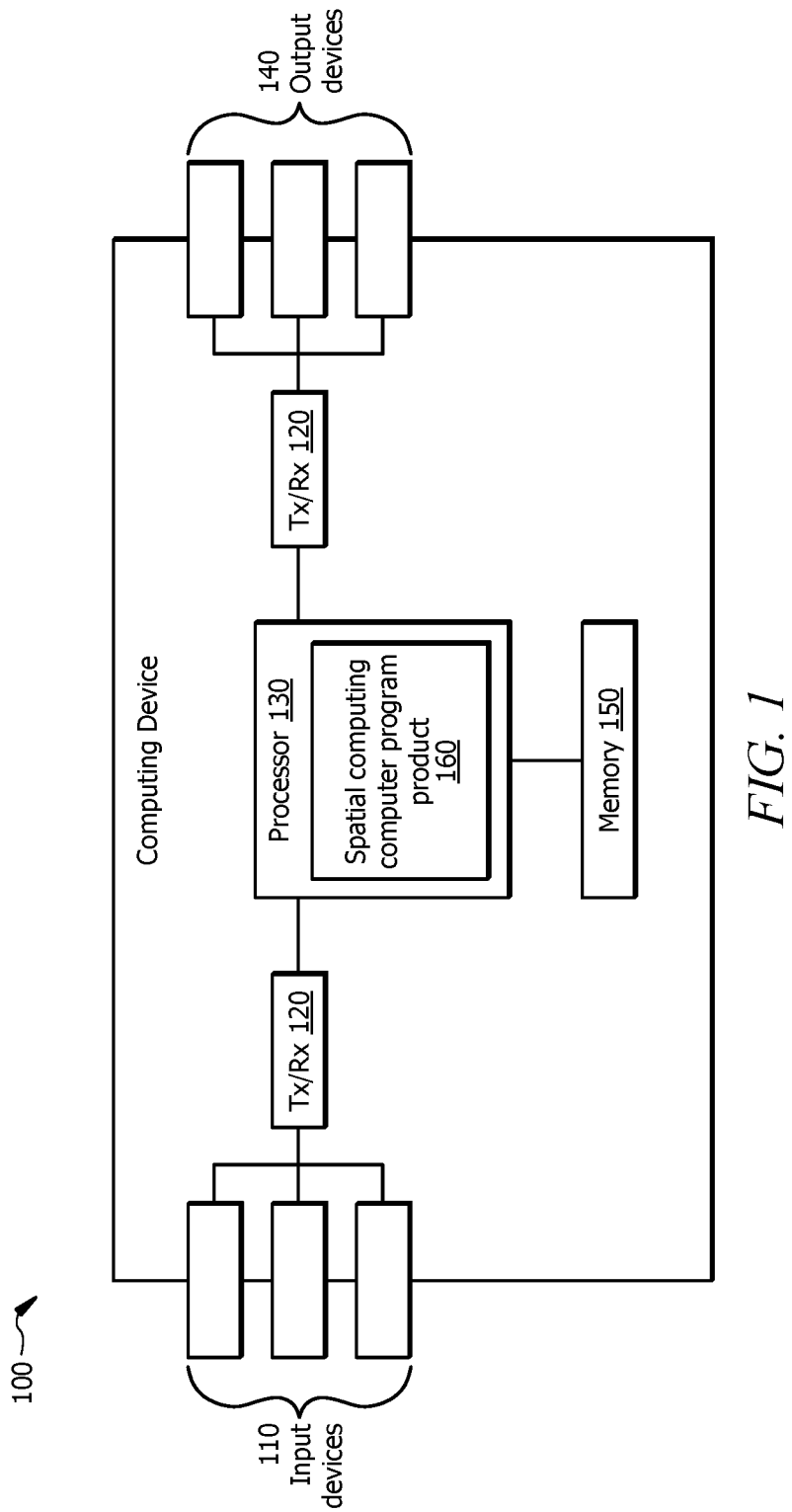
FIG. 1 is a block diagram of an example computing device in accordance with aspects of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some existing AR technologies, such as generally described above, may not facilitate continuous mapping of the physical environment or persistence of data of, or in, an augmented environment. Disclosed herein is a spatial computing scheme in which a physical environment may be scanned and interacted with digitally to create an AR environment. The spatial computing scheme may be at least partially implemented through executable code that is cross-platform or cross-ecosystem compatible. For example, the executable code may be implemented as an application that is cross-platform compatible such that the application is not limited to any particular device model, device operating system, device manufacturer, etc. Similarly, the executable code may be implemented at least partially via one or more application programming interfaces (APIs) that facilitate cross-ecosystem access. As one example, a digital ecosystem, such as a social media platform that provides an application with camera functionality, may include a portion of the executable code, or may access a portion of the executable code via APIs, to provide at least some functionality of the spatial computing scheme within the social media platform. Interaction performed via the social media platform may be compatible with interactions performed via a dedicated application for interacting with the spatial computing scheme, etc.

In at least some examples, the spatial computing scheme includes one or more spatial augmentation layers (SALs). Each SAL may have particular permissions and may be uniquely viewable. For example, the spatial computing scheme may include a single-user SAL, a multi-user shared SAL, and a global SAL. In at least some implementations, only one SAL may be presented, interacted with, and/or displayed on a screen or viewfinder of a device at a time. For example, a user may not view and/or interact with more than one SAL at a time on a single device. In other examples, multiple SALs may be presented, interacted with, and/or displayed on a screen or viewfinder of a device at a time. For example, a user may layer SALs to view and/or interact with more than one SAL at a time on a single device. Alternatively, multiple SALs may be automatically presented and layered and a user may choose which of the SALs to interact with. In yet other examples, while viewing and interacting with one SAL, the user may also interact with another SAL. For example, the user may specify a setting or preference for an augmentation applied in one SAL to also apply to another SAL (e.g., a user may place a digital AR element in the single-user SAL and specify that the digital AR element also be present at the same location in the multi-user shared SAL, etc.).

In some examples, the single-user SAL may be stored and processed locally on a user's device that also presents the single-user SAL to the user and with which the user enables to interact with the single-user SAL. The multi-user shared SAL may be stored locally on a shared device such as a computing hub (e.g., a spatial computing hub) that provides data to the user's device, and devices of other nearby users, to enable the users to interact with the multi-user shared SAL. Alternatively, the multi-user shared SAL may be stored remotely on a cloud computing device that provides data to the devices of multiple users to enable the users to interact with the multi-user shared SAL. In some examples, the users who may access a particular multi-user shared SAL may be provided with a unique subscription link to the multi-user shared SAL, a password to access the multi-user shared SAL after identifying the multi-user shared SAL in a database or listing, etc. such that access to the multi-user shared SAL may be restricted to authorized users. In at least some examples, the multi-user shared SAL may be accessible on a local, or semi-local basis, such as by users communicatively coupled to the same local area network, to facilitate shared experiences among the users with access to the multi-user shared SAL.

The global SAL may be stored remotely on a cloud computing device that provides data to the devices of users to enable the users to interact with the global SAL. In some examples, the global SAL may be accessible to users by selecting the global SAL in a database or listing, by subscribing to the global SAL, etc. In at least some examples, the global SAL may be accessible on a global basis, assuming the availability of Internet access, such that the global SAL may facilitate a global massively multiplayer game.

In at least some examples, augmentations to the multi-user shared SAL or the global SAL are visible in substantially real time (e.g., delayed by inherent networking and communication delays), and editable, by all users who have access to the multi-user shared SAL or a global SAL, respectively. Similarly, in at least some examples user devices that are currently active in a SAL (e.g., interacting with a SAL, viewing a SAL, have opted in to provide location access to the SAL, etc.) may be visible in the SAL to other viewers of the SAL. In other examples, augmentations to the multi-user shared SAL or a global SAL are visible by all users who have access to the multi-user shared SAL or a global SAL, respectively, but are only editable by a user who performed the augmentation, or users given permission to edit by the user who performed the augmentation. In at least some examples, the platform may place certain geographic restrictions on augmentations, such as to prevent harassment, bullying, digital or virtual vandalism/defacing of property, etc. In at least some implementations, any user may choose to hide an augmentation from their personal view, without affecting the views of other users, such as if the user finds the augmentation offensive, distasteful, etc. In some examples, users may further select and report an augmentation for review, either automatic or manual, by a reviewing body to determine whether the augmentation complies with platform policies, is prohibitively distasteful, offensive, harassing, etc. In circumstances in which the augmentation is determined by the reviewing body to be inappropriate (e.g., does not comply with platform policies, is prohibitively distasteful, offensive, harassing, etc.), the reviewing body may act to remove the inappropriate augmentation from view of all users or otherwise moderate the inappropriate augmentation. In some examples, a notification may be placed in the applicable SALs in place of the augmentation, or supplementing the augmentation (e.g., added to, or nearby, the augmentation). In other examples, a notification may be provided to a user who made the augmentation, informing the user of the augmentation's removal and any other information deemed appropriate by the reviewing body or platform operator.

Additionally, at least some examples of digital content that may be placed in a SAL as an AR augmentation may be timed access content. For example, a user may earn, be rewarded with, be granted, purchase, etc. access to certain digital content, or access to a certain amount of time. When the user does not subsequently pay for persistence of the digital content, earn further time for persistence of the digital content, etc., the digital content may be removed from the SAL. In some examples, the digital content may be removed globally at a predetermined time. In other examples, the timing may be per content element such that expiration of the timed access period may differ by specific digital content element or by digital content type.

To facilitate creation of the SALs, the executable code executing on a user device, or accessed by an application (native or web) executing on the user device may capture simultaneous localization and mapping (SLAM) data about a physical environment in which the user device is located. For example, the user device may be a SLAM capable device, such as a smartphone, tablet, or other device having light detection and ranging (LIDAR) functionality, radar functionality, a camera, or any other sensors or components that enable the SLAM capable device of generating data representative of a three-dimensional (3D) space (e.g., the physical environment in which the SLAM capable device is located). Such data capture may be performed according to any suitable means for 3D spatial data capture, the scope of which is not limited herein. In at least some examples, the data capture is performed at least in part according to, or using, ARKIT by APPLE or ARCORE by GOOGLE. The data may form the basis for a 3D spatial map of the environment in which the SLAM capable device is located and which has been scanned or otherwise processed by the SLAM capable device to generate the data. The 3D spatial map is, in at least some examples, a map of a space that was scanned by the SLAM capable device, such as a room of a home, multiple rooms of a home, areas of a retail environment, etc. The 3D spatial map may form the basis for the SALs, such as by facilitating AR or digital augmentations to be added to the SAL and positioned based on elements appearing in the physical environment and digitally represented in the 3D spatial map. In examples in which a SAL includes some spatial data provided by a user, as well other spatial data provided by other users, the spatial data provided by a user who is viewing the SAL may be displayed differently (such as in a different color) than spatial data in the SAL that is provided by other users. In at least some examples, while an application implemented according, at least in part, to the executable code of the spatial computing scheme is executing on the user device, the user device may be capturing data to create, expand, refine, or otherwise alter the 3D spatial map.

In some examples, via an interface of the user device, such as presented by an application implemented at least partially according to the executable code of the spatial computing scheme, digital content may be placed into the spatial map by a user. For example, the user device, or another device such as the spatial computing hub or cloud computing device, may perform processing on the 3D spatial map to identify certain structures, signs, locations, or any other identifiable elements of the 3D spatial map and digital content may be placed into a SAL based on the identified elements automatically without a user specifically placing the digital content. For example, signs located in the 3D spatial map and resulting from the data provided by the SLAM capable device may be replaced in the SAL with interactive digital content. In other examples, elements located in the 3D spatial map and resulting from the data provided by the SLAM capable device may be used as landmarks to guide placement of digital content (e.g., a table may be identified and digital content placed on top of the table, walls identified and digital wallpaper added to the walls automatically, etc.) in a SAL. The application implemented at least partially according to the executable code of spatial computing scheme may implement a Live View function or be referred to as Live View. Live View may enable a user to view and interact with SALs through a screen or other viewfinder of user devices. Via Live View, the user may interact with the user device to place digital content into the SAL corresponding to certain locations in the 3D spatial map or modify previously placed digital content, such as by the user previously, by another user, or automatically without user input. The location of the digital content may be stored, locally or remotely, so that it may be later recalled by the user using the user device, or another device, or recalled by other users using the user device, or other devices. To aid in displaying the SAL relative to a location of the user, as well as placement, and recalling, augmentations applied to the SAL, the user device, via Live View, may use input from computer vision technologies (cameras, depth sensors, lidar, etc.) and/or other spatial awareness technologies, to estimate user positioning in the physical environment on which a displayed SAL is based.

In at least some examples, the digital content may be placed into the SAL based on anchors (such as Azure Spatial anchors by MICROSOFT or other suitable digital anchors) identified and defined in the 3D spatial data. For example, based on an identification of an anchor included in the 3D spatial data, a location of the anchor, including a position and rotation of the anchor may be determined. In at least some examples, the user device may automatically capture images of the physical environment in which the user device is located and analyze, or provide for analysis, the pictures until the anchor is identified and the location of the anchor in one of the captured images is determined.

Based on the determined position and rotation of the anchor, the SAL may be populated with digital content appropriate for the user and/or the SAL. Digital content that is appropriate for the user and/or the SAL may be digital content that the user has permission to access, that the user has previously placed in the SAL, that another user has placed in the SAL and shared with the first user, that a third-party (e.g., vendor, advertiser, store owner, etc.) has placed in the SAL, and the like. The SAL may be populated by the user device or by a device in communication with the user device. The SAL may be populated with the digital content by placing the digital content in positions and rotations relative to the detected position and rotation of the anchor. In at least some examples, the positions and rotations of the digital content relative to the detected position and rotation of the anchor may be obtained from a spatial map file stored on the user device or a remote device. After populating the SAL with the digital content and/or before displaying the SAL or the digital content to the user via a viewfinder or screen of the user device, various properties may be applied to the digital content, such as scaling, textures, classification, interactivity, etc.

User generated content may be privately owned by default by the users who create it. Thus, private data of users remains the user's private data. In at least some examples, the users may elect to retain their data locally on their user device rather that transmitting it to a spatial computing hub or a cloud computing device. In other examples, users may be provided an opportunity to share captured data, such as by transferring primary ownership of user-generated data for public spaces to a platform operator in exchange for incentives, such as to enable the platform operator to use the data in a multi-user shared SAL or a global SAL. The incentives may be virtual or physical (e.g., existing outside the digital realm), and may include monetary or in-kind compensation. In at least some examples, the incentives are a virtual currency usable in a spatial computing scheme, such as in a marketplace operated by the platform operator, and in some examples may be exchangeable for physical currency at an exchange rate determined by the platform operator.

From Live View, users may access other functions related to the spatial computing scheme, such as a storage location for digital content (e.g., a Backpack), a marketplace for digital content (e.g., a Marketplace), a Creator Tool for creating digital content, etc.

In at least some examples, interactive digital content that redirects a user out of the SAL and/or out of Live View may be placed within the SAL. For example, a spatial interactable (e.g., some form of interactive AR element) may be placed in the SAL that displays, or links to, a uniform resource locator (URL) that identifies an Internet-accessible location. In some examples, this may be referred to as AR hyperlinking. When a user interacts with the spatial interactable, the user may be automatically redirected to the Internet-accessible location. Alternatively, when a user interacts with the spatial interactable, the user may be provided with a prompt asking the user whether the user wishes to be redirected to the Internet-accessible location, and in response to receiving an affirmative response from the user, the user may be redirected to the Internet-accessible location. As one specific example, a user may be viewing a SAL in a public space in which a spatial interactable is present. The spatial interactable may be, or be associated with, a hyperlink such as provides via AR hyperlinking. The user may interact with the spatial interactable and, responsive to the interaction, be directed to a URL associate with the hyperlink. In some examples, the URL designates a store of a creator of the spatial interactable, either on the Internet or within the spatial computing scheme (such as to buy access to AR elements created by the creator of the spatial interactable). In other examples, the URL designates a social media profile or website of a creator of the spatial interactable. In at least some examples, the social media profile is an INSTAGRAM profile.

In at least some examples, Live View further facilitates the placement of 3D spatial data points, sometimes referred to as replacers. In at least some examples, these 3D spatial data points may be volumetric and may be positioned to encompass a particular element in the physical environment such that the element may be labeled and uniquely interacted with in the SAL. For example, a volumetric 3D spatial data point may be placed around a television to enable computing devices in the spatial computing scheme to know and understand a position of the television within the SAL.

In at least some examples, Live View further facilitates placement of an AR texture pack or skin. The AR texture pack or skin may retexture identified surfaces (e.g., walls, floors, etc.) in a SAL based on a predetermined or preprogrammed theme. Live View may also facilitate the placement of, editing of, and/or interaction with AR advertisement tiles. As discussed above, Live View may be implemented cross-platform and/or cross-device. For example, Live View may be implemented within an application that uses a camera to capture data, such as INSTAGRAM or SNAPCHAT. In other examples, Live View is provided as a function of a platform operator provided application in which one or more SALs may be immediately viewed after launching an application that includes Live View.

Referring now to FIG. 1, a block diagram of an example computing device 100 is shown. Computing device 100 is any suitable processing device capable of performing the functions disclosed herein such as a user device, a processing device, a user equipment, a smartphone, a wearable computing device, a tablet computing device, an Internet of Things (IoT) device, a computer system, a server, a computing resource, a cloud-computing node or device, a spatial computing hub, a SLAM capable device, etc. Computing device 100 is configured to implement at least some of the features disclosed herein, for example, the spatially aware computing or spatial computing scheme described herein, including the capturing of 3D spatial data, the creation, storing, and/or hosting of a SAL, presenting a Live View application to a user to create an AR environment, re-localizing a device in an AR environment, creating, editing, displaying, and/or interacting with digital elements in a SAL, etc. In various embodiments, for instance, the features of this disclosure are implemented using hardware, firmware, and/or software (e.g., such as software modules) installed to run on hardware. In some embodiments, the software utilizes one or more software development kits (SDKs) or SDK functions to perform at least some of the features/methods of this disclosure.

In some examples, the computing device 100 is an all-in-one device that performs each of the aforementioned operations of the present disclosure, or the computing device 100 is a node that performs any one or more, or portion of one or more, of the aforementioned operations. In one embodiment, the computing device 100 is an apparatus and/or system configured to implement a spatially aware computing environment, according to a computer program product executed on, or by, at least one processor.

The computing device 100 comprises one or more input devices 110. Some of the input devices 110 include at least some of cameras, magnetic sensors, temperature sensors, pressure sensors, accelerometers, microphones, keyboards, touchscreens, buttons, toggle switches, and/or other devices that allow a user to interact with, and/or provide input actively or passively to, the computing device 100. Some other of the input devices 110 are downstream ports coupled to a transceiver (Tx/Rx) 120, which are transmitters, receivers, or combinations thereof. The Tx/Rx 120 transmits and/or receives data to and/or from other computing or electronic devices via at least some of the input devices 110. Similarly, the computing device 100 comprises a plurality of output devices 140. Some of the output devices 140 include at least some of speakers, a display screen (which, in some examples, is also an input device such as a touchscreen), lights, or any other device that allows a user to interact with, and receive output from, the computing device 100. At least some of the output devices 140 are upstream ports coupled to another Tx/Rx 120, wherein the Tx/Rx 120 transmits and/or receives data from other nodes via the upstream ports. The downstream ports and/or the upstream ports include electrical and/or optical transmitting and/or receiving components. In another embodiment, the computing device 100 comprises one or more antennas (not shown) coupled to the Tx/Rx 120. In yet other embodiments, the computing device 100 includes additional Tx/Rx 120 such that the computing device 100 has multiple networking or communication interfaces, for example, such that the computing device 100 communicates with a first device using a first communication interface (e.g., such as via the Internet) and communicates with a second device using a second communication interface (e.g., such as another computing device 100 without using the Internet).

A processor 130 is coupled to the Tx/Rx 120 and at least some of the input devices 110 and/or output devices 140 and is configured to implement the spatial computing environment. In an embodiment, the processor 130 comprises one or more multi-core processors and/or memory modules 150, which functions as data stores, buffers, etc. The processor 130 is implemented as a general processor or as part of one or more application specific integrated circuits (ASICs), field-programmable gate arrays (FPGAs), and/or digital signal processors (DSPs). Although illustrated as a single processor, the processor 130 is not so limited and alternatively comprises multiple processors. The processor 130 further comprises processing logic configured to execute a spatial computing computer program product 160 that is configured to perform spatial computing and/or implement the spatial computing scheme (e.g., such as capturing of data to form a 3D spatial data and/or a SAL, creating, editing, displaying, and/or interacting with digital content in the SAL, etc.) as described herein.

FIG. 1 also illustrates that a memory module 150 is coupled to the processor 130 and is a non-transitory medium configured to store various types of data. Memory module 150 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 150 houses the instructions for carrying out the various embodiments described herein. For example, the memory module 150 comprises the spatial computing computer program product 160, which is executed by processor 130.

Figure 2:
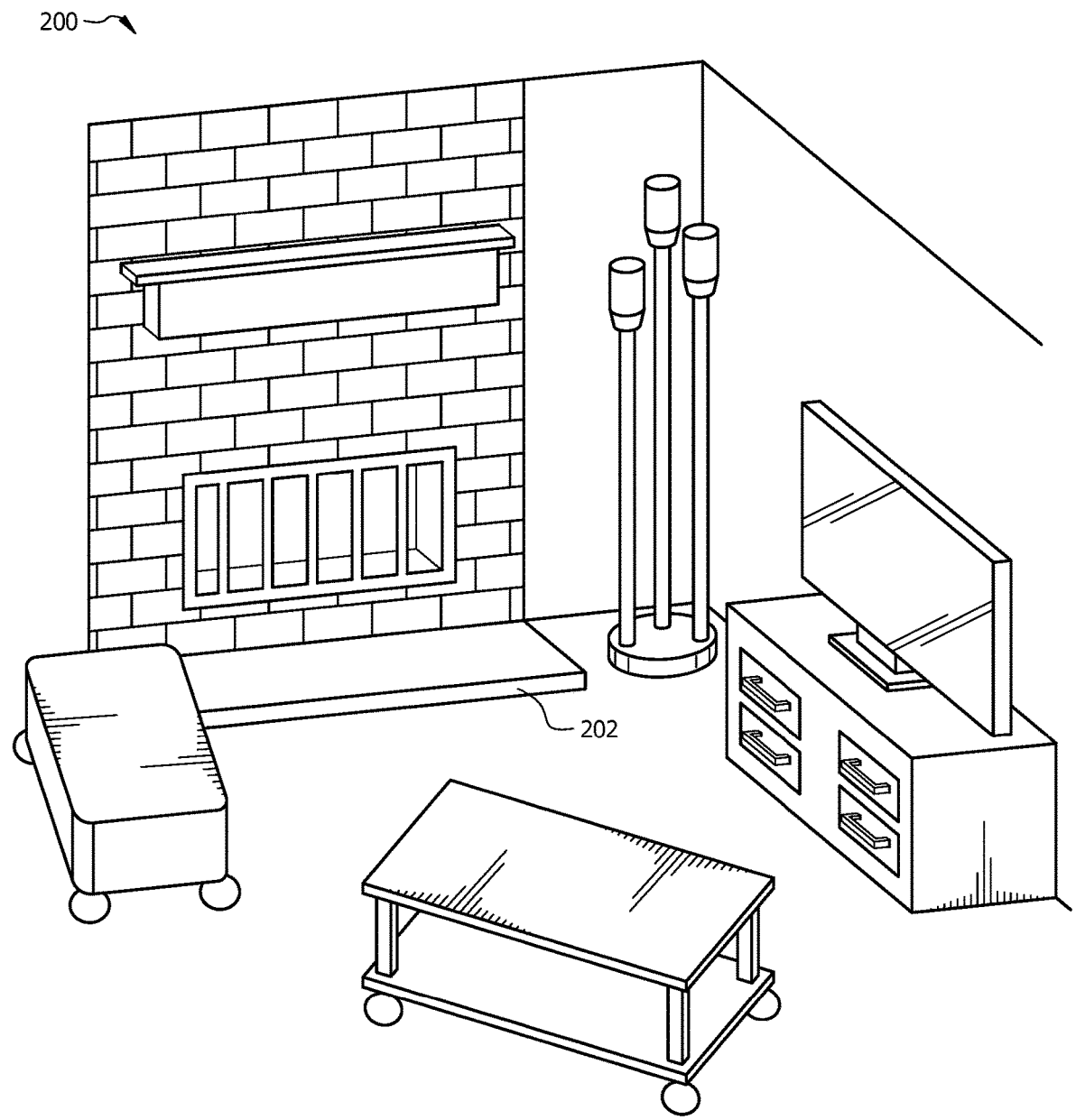
FIG. 2 is a diagram of a physical environment in accordance with aspects of the disclosure.

Referring now to FIG. 2, a diagram 200 of a physical environment is shown. The diagram 200 is generally representative of a residential living space, as seen through the viewfinder of a user device, as described above herein, that includes SLAM capability. In at least some examples, the physical environment may be scanned by the user device to create a plurality of meshes, point clouds, or other data types or structures that digitally represent the physical environment and which may be processed to create a digital 3D representation of at least part of the physical environment. In at least some examples, data generated according to a scan of the physical environment may be transmitted to a spatial computing hub or other server, or saved locally on the user device, as 3D spatial data.

The user device may further determine a geographic location associated with the physical environment of the diagram 200. The geographic location may be determined according to any suitable process, including at least the Global Positioning System (GPS) location or radio triangulation. The user device may transmit the geographic location to the spatial computing hub for association and storage with the 3D spatial data in a spatial map file with the 3D spatial data, or store the geographic location locally on the user device in a spatial map file. The user device may further assign an anchor in the physical environment. The anchor may be any arbitrary point in space located near (e.g., within about 10 meters of) the physical environment. For example, the anchor may be a physical element present in the physical environment. For example, the diagram 200 illustrates an anchor 202 defined as a corner point of a structural feature of the physical environment. While only the anchor 202 is shown in FIG. 2, any number of anchors may be present and that may be located at any user-defined, or automatically selected or assigned, locations.

Figure 3:
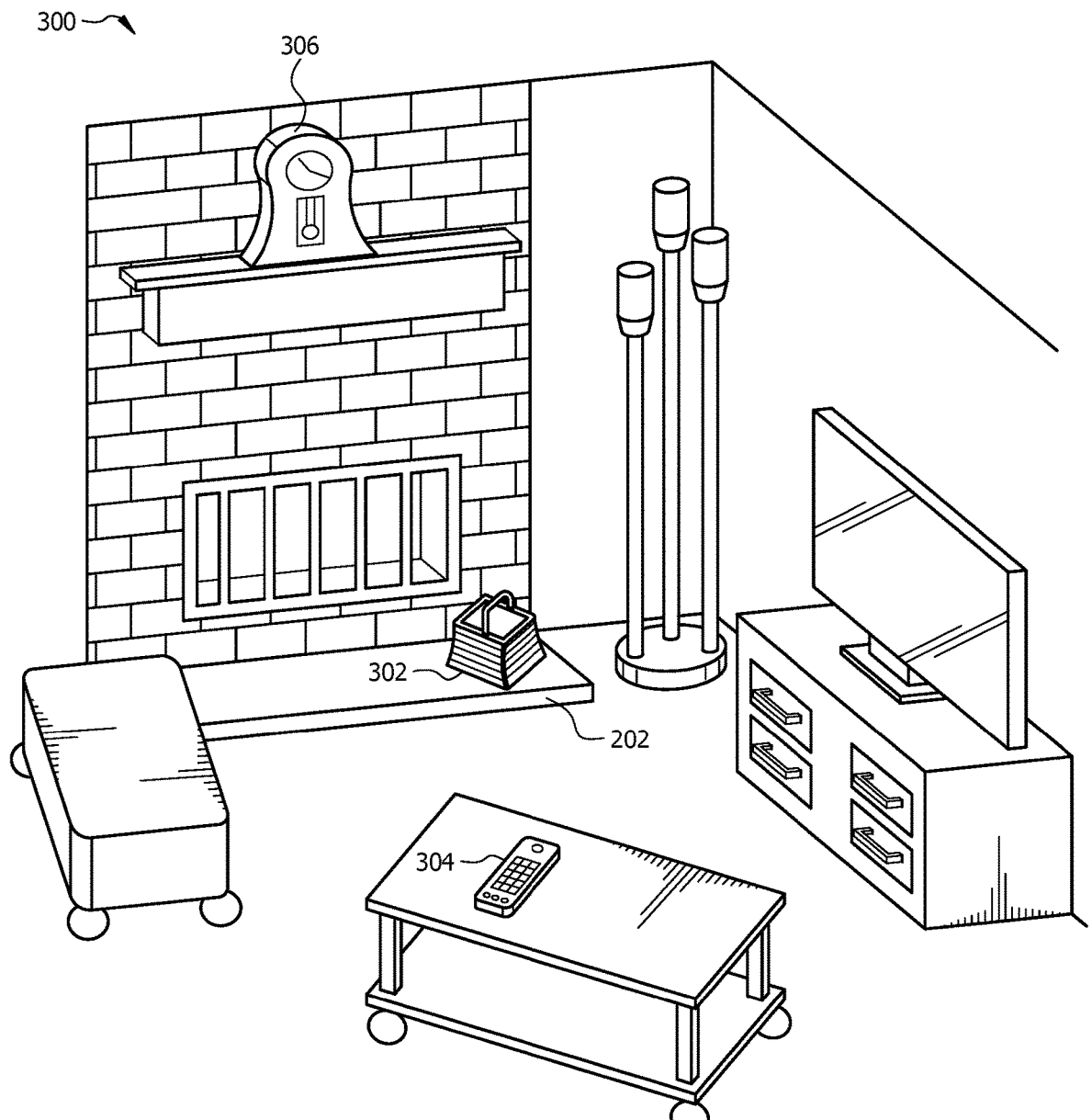
FIG. 3 is a diagram of an augmented reality (AR) environment in accordance with aspects of the disclosure.

Referring now to FIG. 3, a diagram 300 of an AR environment is shown. The diagram 300 is generally representative of a residential living space, as seen through the viewfinder of a user device, as described above herein, augmented with digital content to form the AR environment. For example, after scanning the physical environment depicted in FIG. 2, a user may interact with a user device to place digital content 302, 304, and 306 into an AR environment based on the physical environment. Such interaction may be through a Live View functionality of an application, as described above. After the user places the digital content 302, 304, and 306 into the AR environment, the user device may transmit information related to the digital content 302, 304, and 306 to the spatial computing hub for storage in a spatial map file, or store the information locally in a spatial map file. For example, the user device may transmit location information of the digital content 302, 304, and 306 to the spatial computing hub, or store the information locally, where the location information locates the digital content 302, 304, and 306 in the AR environment relative to the anchor 202. The user device may further transmit or store information regarding properties of the digital content 302, 304, and 306, such as texture, color, size, interactivity, or any other suitable aesthetic or functional properties to the spatial computing hub or store the information locally.

When a user subsequently accesses the AR environment, either via a same user device that scanned the physical environment of the diagram 200 and placed the digital content 302, 304, and 306 in the AR environment in the diagram 300, or another device, the spatial computing hub may transmit information to enable the device to display the AR environment in substantially a same manner as shown in the diagram 300. Alternatively, the information may be obtained from a spatial map file locally stored on the user device. For example, when a user accesses a SAL, digital content in the SAL may be located in the SAL relative to a location of an anchor identified in the SAL and a determined location of the user and user device.

Figure 4:
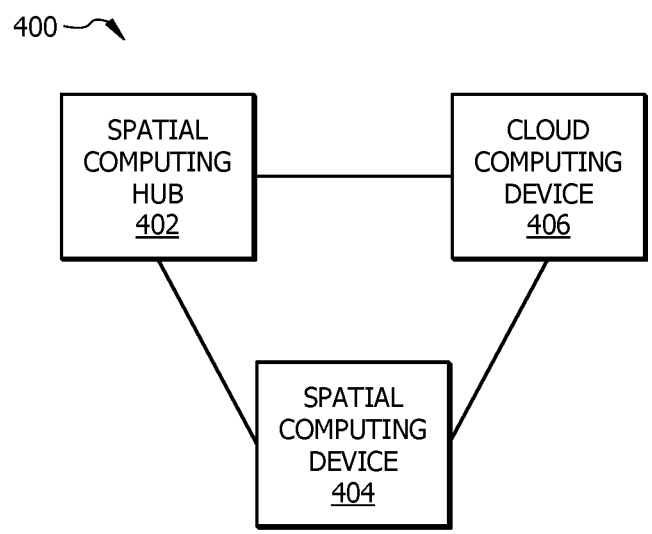
FIG. 4 is an example computing environment in accordance with aspects of the disclosure.

Referring now to FIG. 4, an example computing environment 400 is shown. In at least some examples, the computing environment includes a spatial computing hub 402, a spatial computing device 404, and a cloud computing device 406. At least some of the spatial computing hub 402, the spatial computing device 404, and the cloud computing device 406 may be communicatively coupled, either via a local area network (such as a wireless network within a building) or via a wide area network (such as the Internet). Accordingly, the spatial computing hub 402 and the spatial computing device 404 may be located in substantially a same physical location (e.g., a same room, a same building, etc.) or in different physical locations (e.g., the spatial computing hub 402 in a data center or other off-site location and the spatial computing device 404 in a different location). The cloud computing device 406 may be located remotely to the spatial computing hub 402 and the spatial computing device 404 and be accessible via a wide area network. In at least some examples, the spatial computing hub 402, the spatial computing device 404, and/or the cloud computing device 406 may have hardware architectures as described above with respect to the computing device 100 of FIG. 1.

In at least some examples, the spatial computing device 404 communicates with the spatial computing hub 402 and/or the cloud computing device 406, as described elsewhere herein, according to one or more APIs. For example, the spatial computing device 404 may access or otherwise interact with various APIs to transmit information to the spatial computing hub 402 and/or the cloud computing device 406 or to solicit information from the spatial computing hub 402 and/or the cloud computing device 406. For example, the spatial computing device 404 may generate 3D spatial data and transmit the 3D spatial data to the spatial computing hub 402 and/or the cloud computing device 406 to facilitate creation of a SAL. Alternatively, the spatial computing device 404 may generate a SAL and transmit information representing the SAL to the spatial computing hub 402 and/or the cloud computing device 406. Additionally, the spatial computing device 404 may provide information to the spatial computing hub 402 and/or the cloud computing device 406 regarding digital or AR elements placed into the SAL by a user of the spatial computing device 404.

The spatial computing device 404 may also solicit information from the spatial computing hub 402 and/or the cloud computing device 406, such as a SAL and digital or AR elements located within the SAL. Although not shown in FIG. 4, in at least some examples there are multiple spatial computing devices 404 present in the computing environment 400. Multiple spatial computing devices 404 may access a multi-user shared SAL hosted by the spatial computing hub 402 and/or the cloud computing device 406. Similarly, multiple spatial computing devices 404 may access a global SAL hosted by the cloud computing device 406. Alternatively, in at least some examples, the cloud computing device 406 may delegate responsibility for hosting at least a portion of the global SAL to one or more spatial computing hubs 402 that may be geographically, or communicatively, proximate to spatial computing devices 404 that are accessing the global SAL at a given time.

At least some aspects of this description may be further understood with reference to U.S. Provisional Patent Application No. 62/990,059, filed on Mar. 16, 2020 and titled "System and Method for Sensory Augmentation Including a Hub Device," U.S. Provisional Patent Application No. 63/083,864, filed on Sep. 26, 2020 and titled "Spatially Aware Computing Hub and Environment," and/or U.S. Provisional Patent Application No. 63/127,532, filed on Dec. 18, 2020 and titled "Spatially Aware Environment Relocalization," each of which is incorporated herein by reference in its entirety.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means+/−10 percent of the stated value or reference.

What is claimed is:

1. An apparatus, comprising:
   a memory storing computer executable instructions for implementing a spatially aware computing scheme; and
   a processor coupled to the memory and configured to execute the executable instructions to:
      access a first spatial augmentation layer (SAL) that includes first augmented reality (AR) elements placed into an AR environment for a physical environment proximate to the apparatus, the first SAL including permissions permitting at least a first user of the apparatus and a second user other than the first user of the apparatus to manipulate the first SAL, wherein the second user is not a user of the apparatus;
      display the first AR elements on a display screen communicatively coupled to the apparatus, wherein at least some of the first AR elements are elements placed into the AR environment by the second user other than the first user of the apparatus;
      access a second SAL that includes second AR elements placed into the AR environment, the second SAL including permissions permitting the first user of the apparatus to manipulate the second SAL; and
      display the second AR elements on the display screen concurrently with the first AR elements, wherein the second AR elements are elements placed into the AR environment by the first user of the apparatus and are inaccessible to the second user for viewing or manipulating,
      wherein at least one of the first or second AR elements is a volumetric three-dimensional (3D) spatial data point placed in the AR environment to encompass an interactive object appearing in the physical environment, wherein the volumetric 3D spatial data point enables control of the interactive object from within the first or second SAL.

2. The apparatus of claim 1, wherein the processor is further configured to execute the executable instructions to receive a control input from the first user to cause the processor to modify at least one of the first AR elements placed into the AR environment by the second user.

3. The apparatus of claim 1, wherein the processor is further configured to execute the executable instructions to receive a control input from the first user as an interaction with at least one of the first or second AR elements, wherein the at least one of the first or second AR elements is associated with a uniform resource locator that causes the processor to display an Internet browser with Internet-accessible data defined by the uniform resource locator to the first user.

4. The apparatus of claim 1, wherein the processor is further configured to execute the executable instructions to receive a control input from the first user to place a user-placed AR element in the first or second SAL.

5. The apparatus of claim 1, wherein the second SAL is a single-user SAL stored in the memory and accessible to the first user.

6. The apparatus of claim 1, wherein the first SAL is a multi-user shared SAL stored in the memory or stored remotely to the apparatus, and wherein the multi-user shared SAL is accessible to multiple users given permission to access the multi-user shared SAL.

7. The apparatus of claim 6, wherein AR elements placed into the multi-user shared SAL by one of the multiple users are viewable and editable by other of the multiple users.

8. The apparatus of claim 1, wherein the processor is further configured to execute the executable instructions to:
   access a third SAL that includes third AR elements placed into the AR environment, the third SAL including permissions permitting any of multiple users, including at least the first and second users, to manipulate the third SAL; and
   display the third AR elements on the display screen concurrently with the first AR elements and the second AR elements, wherein the third SAL is a global SAL stored remotely to the apparatus.

9. The apparatus of claim 8, wherein the third AR elements placed into the global SAL by one of the multiple users are viewable and editable by other of the multiple users.

10. A system, comprising:
    a spatial computing hub; and
    a spatial computing device configured to:
       access a first spatial augmentation layer (SAL) that includes first augmented reality (AR) elements placed into an AR environment for a first physical environment proximate to the spatial computing device, the first SAL including permissions permitting at least a first user of the spatial computing device and a second user other than the first user to manipulate the first SAL, wherein the second user is not a user of the spatial computing device;
       display the first AR elements on a display screen communicatively coupled to the spatial computing device, wherein at least some of the first AR elements are elements placed into the AR environment by the second user other than the first user of the spatial computing device;
       access a second SAL that includes second AR elements placed into the AR environment, the second SAL including permissions permitting the first user of an apparatus to manipulate the second SAL; and
       display the second AR elements on the display screen concurrently with the first AR elements, wherein the second AR elements are elements placed into the AR environment by the first user and are inaccessible to the second user for viewing or manipulating, wherein at least one of the first or second AR elements is a volumetric three-dimensional (3D) spatial data point placed in the AR environment to encompass an interactive object appearing in the first physical environment, wherein the volumetric 3D spatial data point enables control of the interactive object from within the first or second SAL.

11. The system of claim 10, wherein the second SAL is stored locally on the spatial computing device and includes AR elements, including at least the second AR elements, placed into the AR environment by the first user.

12. The system of claim 11, wherein the second SAL is a single-user SAL available for viewing only to the first user.

13. The system of claim 10, wherein the first SAL is stored on the spatial computing hub and includes AR elements, including at least the first AR elements, placed into the AR environment by multiple users, including the second user, other than the first user.

14. The system of claim 10, wherein the first SAL is a multi-user SAL available for viewing by multiple users in a second physical environment proximate to the spatial computing hub.

15. The system of claim 10, wherein the first SAL is stored remotely from both the spatial computing device and the spatial computing hub and includes AR elements that are interactive and replace elements of the first physical environment.

16. An apparatus, comprising:
a memory storing computer executable instructions for implementing a spatially aware computing scheme; and
a processor coupled to the memory and configured to execute the executable instructions to:
receive an indication of first augmented reality (AR) elements placed in a first spatial augmentation layer (SAL) of an AR environment by a first user of a first spatial computing device for a physical environment proximate to the first spatial computing device, the first SAL including permissions permitting the first user to manipulate the first SAL;
store the first SAL;
receive an indication of second AR elements placed in a second SAL of the AR environment by a second user other than the first user for the physical environment proximate to the first spatial computing device, the second SAL including permissions permitting at least the first user and the second user to manipulate the second SAL, wherein the second user is not a user of the first spatial computing device; and
provide the first SAL and the second SAL to the first spatial computing device responsive to the first spatial computing device initiating an AR session in the physical environment,
wherein at least one of the first or second AR elements is a volumetric three-dimensional (3D) spatial data point placed in the AR environment to encompass an interactive object appearing in the physical environment, wherein the volumetric 3D spatial data point enables control of the interactive object from within the first or second SAL.

17. The apparatus of claim 16, wherein the first SAL is a single-user SAL available only to the first user of the first spatial computing device.

18. The apparatus of claim 16, wherein the second SAL is a multi-user SAL that includes AR elements, including at least the second AR elements, placed into the multi-user SAL by multiple users of multiple spatial computing devices, including at least the first user and the second user, in the physical environment proximate to the first spatial computing device.

19. The apparatus of claim 16, wherein the second SAL is a global SAL available to all spatial computing device users who access the global SAL, and wherein the second AR elements include at least some elements not placed in the AR environment by the first user and that replace the at least some of the first AR elements in the physical environment.

20. The apparatus of claim 19, wherein at least some of the second AR elements are interactive AR elements that grant rewards to the first user of the first spatial computing device responsive to interaction by the first user with the interactive AR elements.

* * * * *